US006425273B1

(12) United States Patent
Kim et al.

(10) Patent No.: US 6,425,273 B1
(45) Date of Patent: Jul. 30, 2002

(54) TUBULAR LEVER LOCK

(76) Inventors: Dae Young Kim, 105-1009, Seongaeo hamsaorn Apt. 1306-1, Igok-dong, Dalseo-gu, Taegu (KR); Suk Jin Kim, 101-1205, Donbaek Apt. 131, Jincheon-dong, Dalseo-gu, Taegu (KR)

( * ) Notice: Subject to any disclaimer, the term of this patent is extended or adjusted under 35 U.S.C. 154(b) by 0 days.

(21) Appl. No.: 09/466,695

(22) Filed: Dec. 20, 1999

(30) Foreign Application Priority Data

Dec. 22, 1998 (KR) ........................................... 98-26694

(51) Int. Cl.[7] ............................................... B60R 25/02

(52) U.S. Cl. ............................ 70/224; 70/472; 70/149; 292/358; 292/336.3

(58) Field of Search .......................... 70/221–224, 149, 70/472; 292/347, 348, 352, 358, 336.3, 359

(56) References Cited

U.S. PATENT DOCUMENTS

| | | | | | |
|---|---|---|---|---|---|
| 4,920,773 | A | * | 5/1990 | Surko, Jr. | 70/224 |
| 5,666,833 | A | * | 9/1997 | Gao et al. | 70/224 |
| 5,732,578 | A | * | 3/1998 | Kang | 70/224 |
| 5,784,909 | A | * | 7/1998 | Huang | 70/224 |
| 5,794,472 | A | * | 8/1998 | Kester et al. | 70/472 |
| 5,809,815 | A | * | 9/1998 | Lee | 70/472 |
| 5,868,018 | A | * | 2/1999 | Kang | 70/472 |
| 5,927,777 | A | * | 7/1999 | Kuo et al. | 292/358 |
| 5,934,117 | A | * | 8/1999 | Shen | 70/224 |
| 5,941,108 | A | * | 8/1999 | Shen | 70/224 X |
| 6,038,894 | A | * | 3/2000 | Hu | 70/224 |
| 6,141,998 | A | * | 11/2000 | Seo | 70/224 |
| 6,151,934 | A | * | 11/2000 | Chong et al. | 70/221 |
| 6,215,500 | B1 | * | 4/2001 | Kang | 70/224 |
| 6,223,567 | B1 | * | 5/2001 | Fadul | 70/149 |

* cited by examiner

*Primary Examiner*—Suzanne Dino Barrett
(74) *Attorney, Agent, or Firm*—Birch, Stewart, Kolasch & Birch, LLP

(57) ABSTRACT

A tubular lever lock includes a protruded connection part formed at the cross section of a pawl which slides along an inner spindle and interfaced with the operation of an eccentric hole of an operation globe. The spindles are structured to form and to protrude with a square pole passing through a latch by an appropriate distance. A key holder is formed on an outer bundle and is connected with a lock cylinder of an outer spindle, which enables a catch hub installed inwardly and elastically to rotate. With regard to the inner bundle and outer bundle, when built in, the key holder of the outer bundle causes connection with the operation globe through a square hole of a catch hub as well as a hole of the square pole.

3 Claims, 3 Drawing Sheets

TUBULAR LEVER LOCK

BACKGROUND OF THE INVENTION

1. Field of the Invention

The present invention relates to an improved tubular lever lock and more particularly to a tubular lever lock including an inner bundle and an outer bundle so as to be suitable for a handicapped person and further to easily lock and unlock by using a lock cylinder.

2. Description of Related Art

Various types of tubular lever locks are known in the art. A lever lock is generally categorized into a tubular lever lock and a cylindrical lever lock, of which merits and disadvantages are differentiated with each other. Because the cylinder lever lock contains a single bundle alone, its inner and outer plate must be equipped respectively with a lever sagging protection device. Furthermore, a device for balancing a span between the right and left plates in accordance with the thickness of a door while keeping an even distance, with its bundle centered is required. However, such a complicated configuration causes productivity to be decreased and further has a comparative disadvantage in that, in its assembly, the balancing of the empty space between the right and left is not easy to handle due to the thickness of the door. Furthermore, it has such a structure that the locking action is carried out by way of pressing a pawl and the locking is then conducted indoors with a lever rotation, thereby suiting the handicapped person.

But the configuration of the tubular lever lock is more relatively simplified as intended if divided into an inner bundle and an outer bundle owing to the nature of this embodiment. Basically, it has the capability of sagging protection of a lever as well as balancing the right and left intervals due to the door thickness. Furthermore, it facilitates manufacture at much lower cost, installation at the doors, if such a latently laden method is made use of, coupled with the ease of balancing the right and left intervals due to door thickness, and the selection of the lever and/or the knob or a combination of both where required. Therefore, when viewed from the public parameters, it is considered to be satisfactory in terms of function newly employed and the cost of purchase being far more economized. However, the activities of locking and unlocking are conducted by turning the pawl around, which has been appreciated thus far not to suit a handicapped person.

For purposes of facilitating use by a handicapped person, a square pole of a latch which connects the pawl of the inner bundle with the outer lock cylinder must maintain a connected state even when the pawl is pushed. At this junction, a lever of the outer bundle must keep a state of minimal rotation. When reset to unlock, the lever is to satisfy complicated conditions of keeping in connection with the square pole. However, up to this moment, any kind of a newly invented tubular lever lock has not been made available that meets such requisites as outlined above. In light of the production cost and other functional aspects involved, the tubular lever lock is by far superior to the cylindrical lever lock, and yet it has not been widely employed under a mere presumption that it would be inappropriate for a handicapped person.

SUMMARY OF THE INVENTION

Accordingly, it is an object of the present invention to provide a tubular lever lock, which eliminates the above problems encountered with conventional tubular lever locks.

Another object of the present invention is to provide an improved tubular lever lock including an inner bundle and an outer bundle suitable for handicapped persons, which is easily locked and unlocked using a lock cylinder.

A further object of the present invention is to provide a tubular lever lock which makes locking possible by pushing a pawl indoors while maintaining the existing principal functions of the tubular lever lock, which allows lock setting with a lever rotation so as to suit a handicapped person, and to enable the release of the lock setting with any elastic action of pulling a catch plate of the pawl, when lifting the lock from outside.

Still another object of the present invention is to provide an improved tubular lever lock, which is simple in structure, inexpensive to manufacture, durable in use and refined in appearance.

Briefly described, the present invention is directed to a tubular lever lock including a protruded connection part formed at the cross section of a pawl which slides along an inner spindle and interfaced with an eccentric hole of an operation globe built up inside, the spindles being structured to form and to protrude with a square pole passing through a latch in an appropriate distance, a key holder formed on an outer bundle and connected with a lock cylinder of an outer spindle in a big interval, which enables a catch hub installed inwardly and elastically to rotate. With regard to the inner bundle and outer bundle, when built in, the key holder of the outer bundle causes connection with the operation globe through a square hole of a catch hub as well as a hole of the square pole.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled din the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
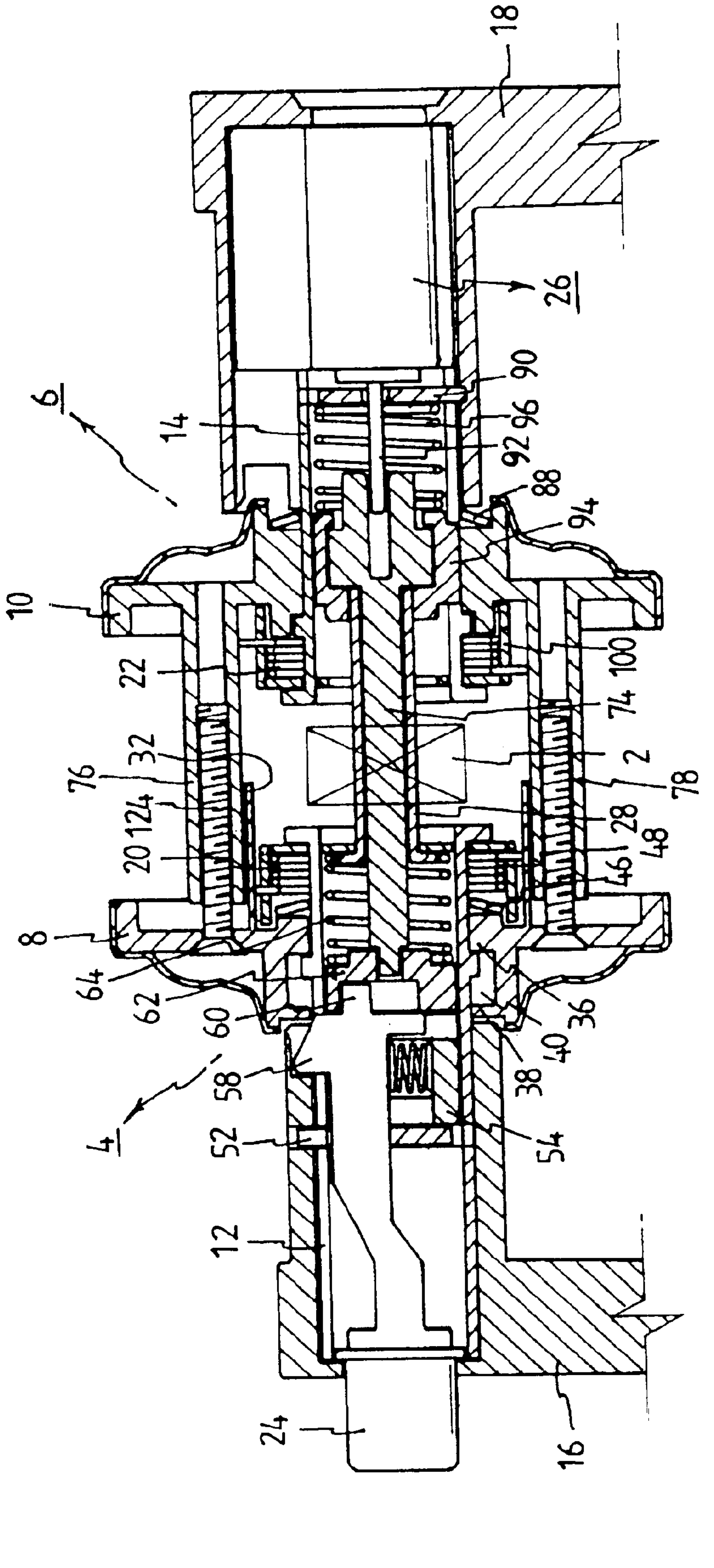
FIG. 1 is a sectional view of a tubular lever lock according to the present invention.
Figure 2:
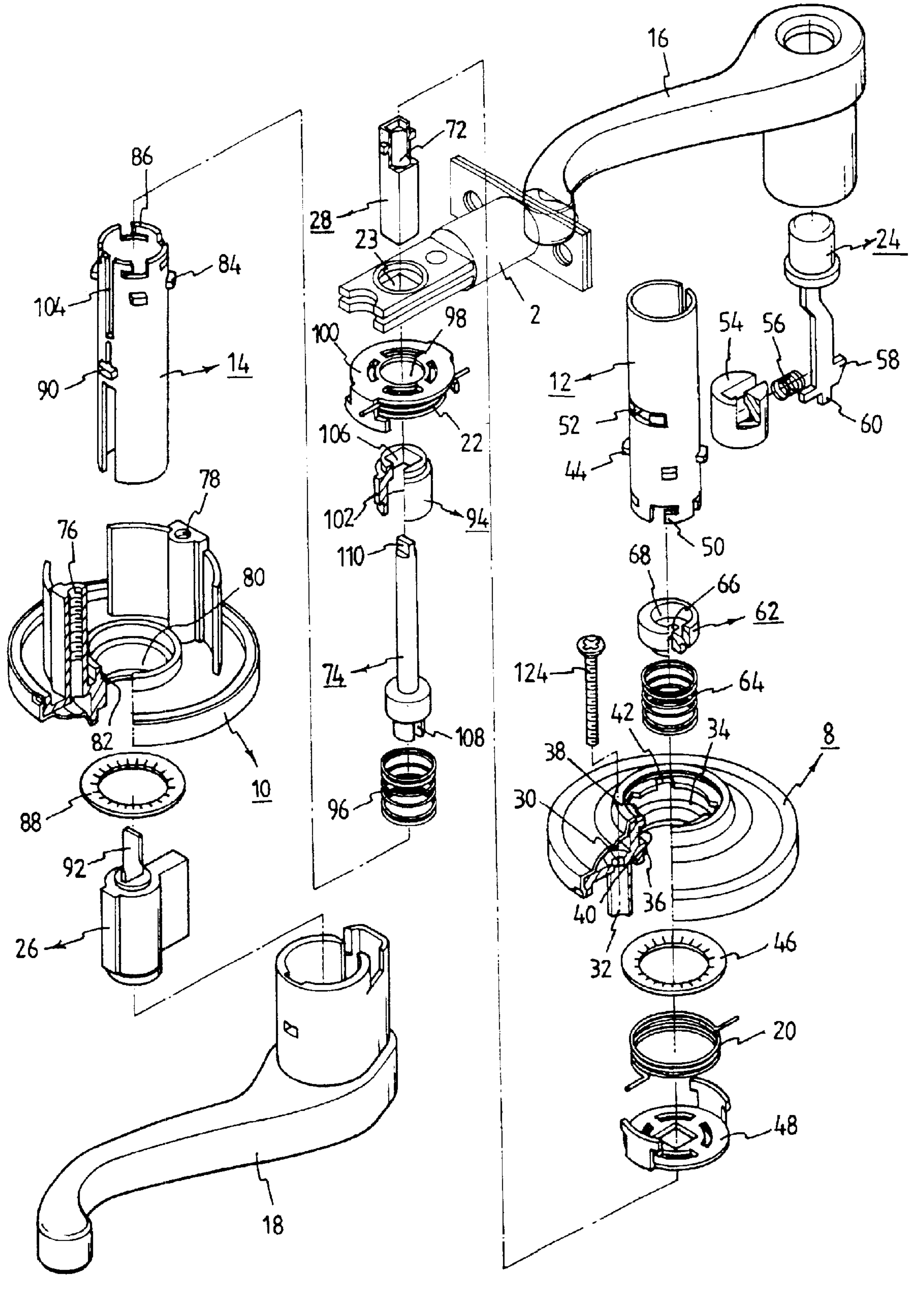
FIG. 2 is an exploded perspective view of the tubular lever lock according to the present invention.

Referring now in detail to the drawings for the purpose of illustrating preferred embodiments of the present invention, the tubular lever lock as shown in FIGS. 1 and 2 includes an inner bundle 4 and an outer bundle 6 having component parts capable of being adjusted in right and left directions, with a latch 2 centered therebetween. The inner bundle 4 and the outer bundle 6 contain first and second spindles 12 and 14 which are connected with first and second plates 8 and 10 by mutual engagement, inner and outer levers 16 and 18 which are-connected with and fixed to the spindles 12 and 14, and first and second rotation springs 20 and 22 for returning the levers 16 and 18 to their original positions, respectively. Operation of the tubular lever lock occurs when a square pole 28 triggers a latch 2 when connected with a pawl 24 of the inner bundle 4 and a lock cylinder 26 of the outer bundle 6, the square pole 28 penetrating a square hole 23 of the latch 2.

As shown in FIG. 2, a connection hole 30 is disposed on both sides of an inner section of a plate 8 of the inner bundle 4. A guide plate 32 protrudes to catch the rotation spring 20 at a central portion of a joining hole 34. An operation chamber 40 is formed with inner and outer catch plates 36 and 38 adjoined together. Furthermore, a few separation grooves for connection with the spindle 12 are formed in the outer catch plate 38. Accordingly, the pawl 24 sliding along the spindles 12 and 14 maintains the locked state by a catch projection 58 engaging with a protrusion 44. The engagement is released by a separation groove 42 formed in the outer catch plate 38 when the inner lever 16 rotates.

The spindle 12, which is allowed to rotate by way of the joining hole 34 of the inner plate 8, engages with an inner portion of the joining hole 34 by a plurality of protrusions 44 formed at positions aligned with the separation groove 42. A spring washer 46 is forcibly installed from an inner portion thereof, enabling the first plate 8 to rotate. A plurality of fixing plates 50 are formed at an end portion of the spindle 12 to connect with a first support 48.

The spindle 12 is equipped with a slot 52. With the installation of the pawl 24, a spring 56 of a pawl case 54 supports the spring 56 from the outside so that the inner lever 16 is able to sustain the pawl 24 from the outside. At the end of the pawl 24, a connection jack 60 is formed for connecting with an operation globe 62.

The operation globe 62 is installed elastically inside the rotation spring 20 and a first spring 64. The connection jack 60 joins with the eccentric hole 68, the eccentric hole 68 being inclined on one side from a narrow, long connection groove 66 located in the middle of the operation globe 62.

At an inner portion of the rotation spring 20, an appropriate length of the square pole 28 remains connected to and fixed by the fixing plate 50 to the inwardly protruded support 48 to sustain the spring 64. The rotation spring 20 is elastically installed at the support 48 and both sectional parts protrude outwardly and are supported against the guiding plate 32 of the plate 8. This causes the connection jack 60 of the pawl 24 to be kept in constant connection with the operation globe 62 of the eccentric hole 68.

The square pole 28 is connected with and fixed to the support 48 at an inner part thereof. A cylindrical guide hole 72 is penetrated and inserted by an elongated key holder 74, which is connected with the pawl 24 of the inner bundle 4 and a lock cylinder 26 of the outer bundle 6. Accordingly, the elongated key holder 74 is allowed to rotate. That is, the key holder 74, which connects the lock cylinder 28 of the outer bundle 6 with the operation globe 62 of the inner bundle 4, keeps an appropriate distance depending upon operation of the pawl 24, and thus causes the connection to be maintained, irrespective of whether the pawl 24 is locked or released.

The outer bundle 6 includes protruding first and second screw tubes 76 and 78 located at a given distance. The screw tubes 76 and 78 cooperate with first and second connecting holes 30 of the inner plate 8 at right and left sides of the plate 10, so that the screw tubes 76 and 78 intersect an elongated guiding plate 32 formed in the inner plate 10. When the intervals are adjusted in accordance with the thickness of the middle of the door, a joining hole 80 and a catch plate 82 of the plate 10 cooperate with a plurality of protrusions 84 formed on the spindle 4. The spindle 14, which is formed with a plurality of fixing plates 86, is inserted from the inner portion of the joining hole 80 and rotates with respect to the plate 10 by way of a spring washer 88 inserted forcibly from an outer end thereof.

The spindle 14, is connected with an outer portion of the plate 10 by a protrusion 90 located halfway along the spindle 14. The lock cylinder 26 is formed with a key lever 92 protruding therefrom. The lock cylinder 26 is inserted in the lever 18, while the outer surface of the lever 18 is connected and fixed by the protrusion 90 opn the spindle 14.

The elongated key holder 74, which is connected with the pawl 24 of the inner bundle 4 and the lock cylinder 26 of the outer bundle 6, is connected and installed by a catch hub 94, which is mounted for rotation and sliding movement along the spindle 14. The catch hub 94 is kept in connection with the pawl 24 and the key holder 74 by elastic installation with the spring 96.

At the sectional part of the spindle 14, a fixing plate 86 is connected with and fixed to a cylindrical hole 98 formed in a support 100, so as to support the spring 96. The rotation spring 22 is elastically installed at the support 100 so that both section parts protruding outwardly are sustained by the screw tubes 76 and 78 of the plate 10.

The catch hub 94, which supports the key holder 74 at one end, is made to slide to the right and left side by a guide plate 102 inserted in a protruded guide groove 104 of the spindle 14 in the horizontal direction. At the other end, the elongated key holder 74 penetrates and protrudes inwardly through the square hole 106 of the catch hub 94. At the time of catch and release of the pawl 24, the square pole 28 of the inner bundle 4 is connected with or separated from the square hole 106 of the catch hub 94.

The elongated key holder 74 is formed at its rear end, with a connection groove 108 in accordance with the operation of the pawl 24. The key lever 91 of the lock cylinder 26 is connected with the connection groove 108. At the section part of the long connection pole connected through the square hole 106 of the catch hub 94, connection plate 110 is formed so that the square pole 28, when in an assembly of the inner and outer bundles 4 and 6, is connected with connection groove 66 formed in operation globe 62 of the inner bundle 4 and penetrates the guide hole 72. The square pole 28, when the sliding of the pawl 24 is activated for locking and releasing, is connected with or separated from the square hole 106 of the catch hub 94. The elements 124 and 126 are screw nails, respectively.

Figure 3:
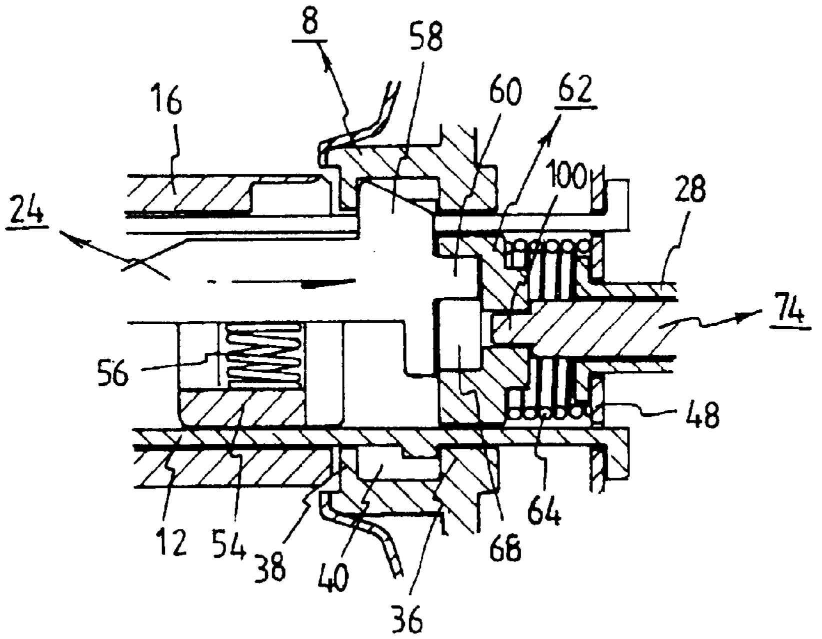
FIG. 3 is a sectional view of the tubular lever lock according to the present invention in a locked position.
Figure 4:
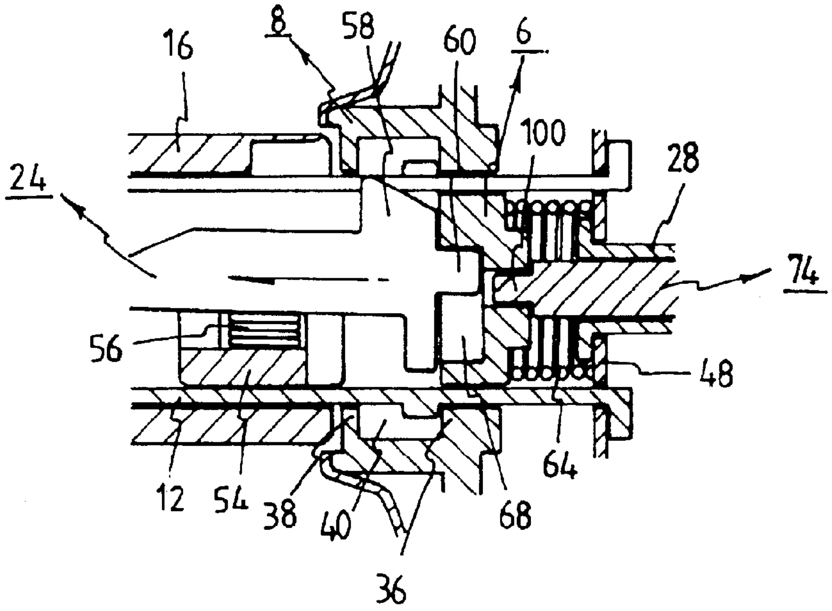
FIG. 4 is a sectional view of the tubular lever lock according to the present invention in an unlocked position.

Referring to FIGS. 3 and 4, the tubular lever lock according to the present invention operates as follows. First of all, the inner and outer bundles 4 and 6 are joined with a door installed with the latch 2 halfway between. The square pole 28 of the inner bundle 4 penetrates the square hole 23 of the latch 2 toward its other end. The elongated key holder 74 protruded inwardly from the outer bundle 6 is inserted into the square pole 28 of the inner bundle 4.

In connection with the above, the inner bundle 4 and outer bundle 6 are assembled in a direction such that they are adjusted to straighten the connection holes 30 of the inner bundle 4 and the screw tubes 76 and 78 of the outer bundle 6. This makes the screw tubes 76 and 78 protruding from the outer bundle 6 and the guide plate 32 protruding from the inner bundle 4 interface to guide the screw tubes 76 and 78 into cooperation with the connection holes 30. Then, the adjustment of the inner bundle and the outer bundle in accordance with the thickness of the door is facilitated, when the assembly is completed with the elongated screws 124 and 126 inserted and fixed through the connection holes 30 of the inner plate 8.

The elongated key holder 74 rotating by the lock cylinder 26 of the outer bundle 6, when installed, is connected with the operation globe 62 through a sectional part of the connection plate 110. A section part of the inner bundle 4 is joined with or disintegrated from the square hole 106 formed in the catch hub 94 of the outer bundle 6 depending upon a catch or release of the pawl 24.

Furthermore, the catch plate 58, which the spring 56 of the pawl case 54 supports elastically from an outward direction, when the pawl 24 is pushed from indoors, advances into the operation chamber 40 of the plate 8 and catches with the outer side of the catch plate 38. At this time, since the connection jack 60 of the pawl 24 is already caught with a rounded edge groove amid the eccentric hole 68 of the operation globe 62 and the catch plate 58 of the pawl 24 protrudes extremely in the outward direction, the catch plate 38 is tightly operated.

When the pawl 24 is pushed, the operation globe 62 connected through the connection jack 60 of the section part of the pawl 24 advances forward. The advance of the operation globe 62, the key holder 74 of the outer bundle 6 and catch hub 94 connected with the key holder 74 all retreat together. When the square pole 28 fixed to the section part thereof retracts from the square hole 106 of the retreating catch hub 94, the outer lever 18 is kept in a locked condition with minimal rotation.

As shown in FIG. 3, under such a locked position, the inner lever 16 of the lock cylinder 26 is used as a means to unlock. The method of releasing the lock by use of the inner lever 16 is to simply turn around the inner lever 16 to cause the pawl 24 sliding along the guide groove 104 of the spindle 12 to rotate side by side. Furthermore, the catch plate 58 reaches the separation groove 42 formed at the outer side of the catch plate 38 of the plate 8. The catch condition is therefore set to retreat and is relieved by the force of the spring 64. When the pawl 24 sets back, the catch hub 94 connected with the key holder 74 advances forward by the amount of distance of the pawl 24's retreat caused by the repelling force of the spring 64. At this time, the sectional part of the square pole 28 of the inner bundle 4 again enters the square hole 106 of the catch hub 94, and the rotation of the outer lever 18 makes both locking and releasing possible.

At this time, the catch hub 94 sliding along the spindle 14 is set to be impossible to rotate, and the square pole 28 also is fixed to the spindle 12 through the support 48. Under the state where the inner lever 16 and outer lever 18 are set to retreat, the sectional part of the square pole 28 is easily connected with or released from the square hole 106 of the catch hub 94.

As shown in FIG. 4, the key lever 92 of the lock cylinder 26 rotates by a key and the key holder 74 connected therewith causes the operation globe 62 to rotate, with the catch hub 94 and the square pole 28 as a supporting component. When the operation globe 62 rotates, the connection jack 60 located in the eccentric hole 68, with the spindle 12 and the inner lever 16 in fixed condition, is drawn inwardly in the reversed catch direction of the catch plate 58 by the eccentric hole 68. Then the catch plate 58 of the pawl 24 is set to separate from the operation chamber 40 of the plate 8 and, at the same time, the pawl 24 retreats by the repelling force of the spring 64. Then, the locking is set to be released. In a similar manner, both the key holder 74 and catch hub 94 advance by the amount of distance of the setback of the pawl 24 due to be released by the pawl 24, when the section part of the square pole 28 enters into the square hole 106 of the catch hub 94 and is set to the state of rotation, making locking and releasing possible by the inner lever 18.

Accordingly, while satisfying principal functions of the tubular lever lock according to the present invention such as protecting drooping of the inner and outer lever 18 and adjusting the right and left intervals in accordance with the thickness of the door, locking by pressing the pawl 24 and releasing by the rotation of the inner lever 16 are easily operated by a handicapped person. When locking and releasing from the outside with the use of the lock cylinder 26 is desired, the locking is set to release with the drawing of the catch plate 58 through the eccentric hole 68 of the operation globe 62, which makes the action of locking and releasing smoother from outside.

The invention being thus described, it will. be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A tubular lever lock comprising:

first and second spindles rotatably installed on first and second plates, respectively;

inner and outer levers joined from an outside of said first and second spindles, respectively;

first and second rotating springs for returning said inner and outer levers to an original position;

an inner bundle including a pawl for sliding along the first spindle, and an operation globe and a square pole having a hole formed therethrough elastically joined therewith, said square pole penetrating and connecting with a latch by an appropriate length; and said operation globe includes an eccentric hole formed therein, said eccentric hole receiving a connection jack formed on an end of said pawl; and an outer bundle including a key holder for connecting said operation globe to a lock cylinder, and a catch hub having a square hole therethrough for connecting with said square pole, said key holder being supported within the hole formed through said square pole. said operation globe including an eccentric hole formed therein, said eccentric hole receiving a connection jack formed on an end of said pawl.

2. The tubular lever lock according to claim 1, wherein said key holder includes a connection plate formed at a first end, and said operation groove includes a connection groove formed therein, said connection plate being operably connected to said connection groove.

3. The tubular lever lock according to claim 2, wherein said key holder includes a groove formed on a second end, and said lock cylinder includes a key lever protruding therefrom, said groove formed on said key holder being operably connected to said key lever.

* * * * *